(12) United States Patent
Murosawa et al.

(10) Patent No.: US 7,517,418 B2
(45) Date of Patent: *Apr. 14, 2009

(54) PRODUCTION METHOD OF ELECTRONIC DEVICE HAVING INTERNAL ELECTRODE

(75) Inventors: Shogo Murosawa, Chuo-ku (JP); Shigeki Satou, Chuo-ku (JP); Takeshi Nomura, Chuo-ku (JP)

(73) Assignee: TDK Corporation, Tokyo (JP)

( * ) Notice: Subject to any disclaimer, the term of this patent is extended or adjusted under 35 U.S.C. 154(b) by 565 days.

This patent is subject to a terminal disclaimer.

(21) Appl. No.: 10/540,842

(22) PCT Filed: Dec. 26, 2003

(86) PCT No.: PCT/JP03/17010

§ 371 (c)(1),
(2), (4) Date: Jun. 24, 2005

(87) PCT Pub. No.: WO2004/061879

PCT Pub. Date: Jul. 22, 2004

(65) Prior Publication Data

US 2006/0096693 A1 May 11, 2006

(30) Foreign Application Priority Data

Dec. 27, 2002 (JP) ............... 2002-378811

(51) Int. Cl.
C03B 29/00 (2006.01)
B44C 1/16 (2006.01)
B44C 1/24 (2006.01)
B32B 37/10 (2006.01)
B32B 37/14 (2006.01)
B32B 37/18 (2006.01)
B32B 37/26 (2006.01)
C03B 29/02 (2006.01)
C03B 29/04 (2006.01)
B44C 1/18 (2006.01)

(52) U.S. Cl. ............... 156/89.16; 156/89.12; 156/233; 156/235; 156/241; 156/289

(58) Field of Classification Search ............. 156/89.12, 156/89.16, 233, 235, 241, 289
See application file for complete search history.

(56) References Cited

U.S. PATENT DOCUMENTS 6,550,117 B1   4/2003   Tokuoka et al.
6,602,370 B1 *  8/2003  Kuramitsu et al. ....... 156/89.12
7,014,725 B2 *  3/2006  Nagai et al. ............. 156/89.11
7,318,874 B2 *  1/2008  Roosen et al. ........... 156/89.11
7,402,220 B2 *  7/2008  Murosawa et al. ....... 156/89.12
2001/0006451 A1 *  7/2001  Miyazaki et al. ......... 361/321.2
2001/0010617 A1 *  8/2001  Miyazaki et al. ......... 361/321.2
2002/0164469 A1   11/2002  Hanai
2003/0155064 A1 *  8/2003  Katsuyama et al. ...... 156/89.12

FOREIGN PATENT DOCUMENTS

| CN | A 1374668 | 10/2002 |
| EP | 0 923 094 A2 | 6/1999 |
| JP | A 63-51616 | 3/1988 |
| JP | A 01-151218 | 6/1989 |
| JP | A 03-250612 | 11/1991 |
| JP | A 06-232000 | 8/1994 |
| JP | 07-169638 | 7/1995 |
| JP | A-07-283073 | 10/1995 |
| JP | A 07-312326 | 11/1995 |
| JP | A 08-153646 | 6/1996 |
| JP | A 11-238646 | 8/1999 |
| JP | A 2002-203709 | 7/2002 |
| JP | A 2002-216540 | 8/2002 |
| JP | A 2002-260954 | 9/2002 |
| JP | A 2002-361618 | 12/2002 |
| WO | 02/074715 * | 9/2002 |
| WO | WO 02074715 A1 * | 9/2002 |
| WO | 03/003667 * | 5/2003 |
| WO | WO 03036667 A1 * | 5/2003 |

* cited by examiner

*Primary Examiner*—Philip C Tucker
*Assistant Examiner*—Sonya Mazumdar
(74) *Attorney, Agent, or Firm*—Oliff & Berridge, PLC

(57) ABSTRACT

A release layer 22 is formed on a surface of a first supporting sheet 20. Next, an electrode layer 12a is formed on a surface of the release layer 22. When the electrode layer 12a is pressed against a surface of a green sheet 10a to bond the electrode layer 12a with the green sheet 10a, an adhesive layer 28 is formed by a transfer method on a surface of the electrode layer 12a or a surface of the green sheet 10a. It becomes possible to easily transfer a dry type electrode layer to the surface of the green sheet with high accuracy without breaking or deforming the green sheet, moreover, components of the adhesive layer do not soak in the electrode layer or green sheet. Also, the supporting sheet is extremely easily released, and a production cost of a multilayer ceramic capacitor is reduced.

16 Claims, 6 Drawing Sheets

PRODUCTION METHOD OF ELECTRONIC DEVICE HAVING INTERNAL ELECTRODE

TECHNICAL FIELD

The present invention relates to a production method of a multilayer electronic device having an internal electrode, such as a multilayer ceramic capacitor.

BACKGOUND ART

In recent years, along with a variety of electronic apparatuses becoming more compact, an electronic device to be installed in an electronic apparatus has become more compact and higher in performance. A multilayer ceramic capacitor as one of the electronic devices is also expected to be more compact and higher in performance.

For pursuing a more compact multilayer ceramic capacitor having a larger capacity, there has been a strong demand for a thinner dielectric layer. Recently, a thickness of a dielectric green sheet has come to several µm or thinner.

To produce a ceramic green sheet, ceramic slurry made by ceramic powder, a binder (an acrylic based resin and a butyral resin, etc.), a plasticizer and an organic solvent (toluene, alcohol and MEK, etc.) is normally prepared first, then, the ceramic slurry is applied to a carrier sheet, such as PET, by using the doctor blade method, etc. and dried by heating.

Also, in recent years, a production method of preparing ceramic suspension obtained by mixing ceramic powder and a binder in a solvent, and performing 2-dimensional drawing on a film-shaped mold obtained by extrusion molding of the suspension has been studied.

A method of producing a multilayer ceramic capacitor by using the ceramic green sheet explained above will be explained specifically. An internal electrode conductive paste including metal powder and a binder is printed to be a predetermined pattern on the ceramic green sheet and dried to form an internal electrode pattern. Next, a carrier sheet is released from the ceramic green sheet, a plurality of the results are stacked and cut to be a chip shape, so that a green chip is obtained. Next, after firing the green chip, an external electrode is formed, and the multilayer ceramic capacitor is produced.

However, in the case of printing the internal electrode paste on an extremely thin ceramic green sheet, there is a disadvantage that a binder component in the ceramic green sheet is dissolved or swollen due to a solvent in the internal electrode paste. Also, there is a disadvantage that an internal electrode paste soaks in the green sheet. These disadvantages often cause a short-circuiting defect.

To eliminate the disadvantages, in articles 1 to 3 (the Japanese Unexamined Patent Publication Nos. 63-51616, 3-250612 and 7-312326), a dry type electrode pattern is separately prepared by forming an internal electrode pattern on a supporting sheet and drying the same. An internal electrode pattern transfer method for transferring the dry type electrode pattern to a surface of each ceramic green sheet or a surface of a multilayer body of ceramic green sheets has been proposed.

In the techniques described in the articles 1 and 2, an electrode pattern is formed by printing on a supporting film and thermal transfer is performed, however, there is a problem that the electrode pattern is hard to be released from the supporting film.

Also, in consideration of releasability and transferability in a stacking step, in a normal ceramic green sheet, a dielectric paste composing the green sheet is added with a release agent, or a release agent is coated on a supporting sheet to be formed with the green sheet. Accordingly, when the ceramic green sheet is particularly thin, the ceramic green sheet on the supporting sheet has very weak strength and is in a brittle state. Alternately, the ceramic green sheet on the supporting sheet easily deviates from the supporting sheet. Therefore, it is extremely difficult to transfer a dry type electrode pattern to a surface of the green sheet with high accuracy, and the ceramic green sheet is partially broken in the transfer step in some cases.

Also, in the technique described in the article 3, a layer exclusive for forming an electrode pattern and a rear-transfer prevention layer, etc. are formed to prevent cissing, etc. of an electrode pattern at the time of forming a release layer on a supporting sheet to be formed with a dry type electrode pattern. In this method, it is expected that transfer of the electrode pattern to a surface of a green sheet becomes easy, however, it is not sufficient and a problem of increasing a production cost of the supporting sheet remains.

Also, in the transfer method according to these conventional techniques, since a high pressure and heat are necessary to transfer the electrode pattern layer to the surface of the green sheet, the green sheet, electrode layer and supporting sheet often deform and become unable to be used at the time of stacking, and there is a possibility of causing a short-circuiting defect due to break of the green sheet.

Also, when bonding the green sheet with the electrode layer, it was difficult to selectively peel off one of two supporting sheets for respectively supporting the both.

Note that a method of forming an adhesive layer on a surface of the electrode layer or green sheet is considered for easier transfer of the electrode layer. However, when forming an adhesive layer directly on the surface of the electrode layer or green sheet by a coating method, etc., components of the adhesive layer soak in the electrode layer or green sheet. Therefore, a function as an adhesive layer is hard to be attained, and it is liable that a composition of the electrode layer or green sheet is adversely affected.

DISCLOSURE OF THE INVENTION

The present invention was made in consideration of the above circumstances and has as an object thereof to provide a production method of a multilayer electronic device including an internal electrode, by which a green sheet is not damaged or deformed, components of an adhesive layer do not soak in an electrode layer or the green sheet, a dry type electrode layer can be easily transferred to a surface of the green sheet with high accuracy, moreover, a supporting sheet is extremely easily released, and the cost is reduced.

The present inventors have been committed themselves to study for attaining the above objects, found that, by forming an adhesive layer on a surface of an electrode layer or green sheet by a transfer method, a thickness of an adhesive layer can be made thin and, furthermore, components of the adhesive layer do not soak in the electrode layer or green sheet, and the object of the present invention can be attained, and completed the present invention.

Namely, according to the present invention, a production method of a electronic device including an internal electrode comprises the steps of forming a release layer on a surface of a first supporting sheet;

forming an electrode layer on a surface of said release layer;

pressing said electrode layer against a surface of a green sheet to bond said electrode layer with the surface of said green sheet;

stacking the green sheets bonded with said electrode layer to form a green chip; and firing said green chip;

wherein before pressing said electrode layer against the surface of said green sheet, an adhesive layer is formed on a surface of said electrode layer or a surface of said green sheet by a transfer method.

Preferably, said green sheet is formed on a surface of a second supporting sheet in a releasable way and, after said electrode layer is bonded with a surface of said green sheet, said second supporting sheet is released from the surface of said green sheet.

Preferably, said adhesive layer is formed on a surface of a third supporting sheet in a releasable way first and pressed against a surface of said green sheet or a surface of said electrode layer so as to be bonded.

In the production method of electronic device having an internal electrode according to the present invention, an adhesive layer is formed by a transfer method on a surface of an electrode layer or green sheet and the electrode layer is bonded with a surface of the green sheet via the adhesive layer. By forming the adhesive layer, a high pressure and heat become unnecessary at the time of bonding the electrode layer with the surface of the green sheet for transferring, and bonding at a lower pressure and lower temperature becomes possible. Accordingly, even in the case of an extremely thin green sheet, the green sheet is not broken, green sheets bonded with an internal electrode can be preferably stacked, and short-circuiting defect, etc. are not caused.

Also, for example, by making an adhesive force of the adhesive layer stronger than that of the release layer and making an adhesive force of the release layer stronger than that between the green sheet and supporting sheet, the supporting sheet on the green sheet side can be selectively released easily.

Furthermore, according to the present invention, since the adhesive layer is not formed directly on the surface of the electrode layer or green sheet by a coating method, etc. but formed by a transfer method, components of the adhesive layer do not soak in the electrode layer or green sheet and an extremely thin adhesive layer can be formed. For example, a thickness of said adhesive layer can be made thin as 0.02 to 0.3 μm or so. Although the thickness of the adhesive layer is thin, components of the adhesive layer do not soak in the electrode layer or green sheet, so that the adhesive force is sufficient and a composition of the electrode layer or green sheet is not adversely affected.

Preferably, to form said green chip, a step of pressing another electrode layer to be bonded against an opposite surface of the electrode layer side of the green sheet bonded with said electrode layer so as to bond the electrode layer via an adhesive layer formed by the transfer method, and a step of pressing the electrode layer against another green sheet so as to bond via an adhesive layer formed by the transfer method are repeated.

Alternately, to form said green chip, a step of pressing another green sheet to be bonded against a surface on the electrode layer side of the green sheet bonded with said electrode layer so as to bond the green sheet via an adhesive layer formed by the transfer method, and a step of pressing another electrode layer against the green sheet so as to bond via an adhesive layer formed by the transfer method may be repeated.

By repeating the above steps, an electronic device, such as a multilayer ceramic capacitor having a large number of layers, can be easily produced.

Preferably, a thickness of said adhesive layer is 0.02 to 0.3 μm. When a thickness of the adhesive layer is too thin, a thickness of the adhesive layer becomes thinner than asperity on the green sheet surface, and adhesiveness tends to decline remarkably. While, when a thickness of the adhesive layer is too thick, spaces easily arise inside an element body after sintering depending on the thickness of the adhesive layer and capacitance tends to decline remarkably by an amount of the volume.

Preferably, said electrode layer is formed to be a predetermined pattern on a surface of said release layer, and a blank pattern layer having substantially the same thickness as that of said electrode layer is formed on a surface of the release layer not formed with the electrode layer. Preferably, said blank pattern layer includes substantially the same dielectrics as that composing said green sheet. Preferably, said blank pattern layer includes substantially the same binder as that of said green sheet.

By forming a blank pattern layer, a level difference on the surface due to an electrode layer having a predetermined pattern can be eliminated. Therefore, even if a pressure is applied before firing after stacking a large number of green sheets, an outer surface of a stacked body remains flat, positional deviation in the plane direction of the electrode layer is not caused, moreover, green sheet is not staved in to cause short-circuiting.

Preferably, said release layer includes substantially the same dielectrics as that composing said green sheet. In that case, even if the release layer adheres to the surface of the electrode layer to remain, the remaining release layer does not cause any problem. It is because the remaining release layer is sufficiently thin comparing with the green sheet and includes the same dielectric as that composing the green sheet, so that it becomes a part of the dielectric layer in the same way as the green sheet if stacked with the green sheet and fired together.

Preferably, said release layer includes substantially the same binder resin as that included in said green sheet. Preferably, said adhesive layer includes substantially the same binder resin as that included in said green sheet. Preferably, said electrode layer includes substantially the same binder resin as that included in said green sheet.

By using the same binder resin as above, a stronger adhesive force can be obtained comparing with the case of using two or more kinds of binder resins.

Furthermore preferably, said binder resin includes a butyral based resin as a part thereof or is composed only of a butyral based resin. When the binder resin is a specific butyral based resin, a green sheet can be made thinner and preferably bonded with a low pressure.

Also, the release layer, adhesive layer, electrode layer and green sheet may include a plasticizer with a binder resin, and the plasticizer is included preferably by 25 to 100 parts by weight with respect to 100 parts by weight of the binder resin.

Preferably, a thickness of said green sheet is 3 μm or thinner. In accordance with the present invention, the green sheet of 3 μm or thinner can be stacked easily.

Preferably, the thickness of the release layer is the same or less than the thickness of the electrode layer. The thickness of the release layer is set to be preferably 60% and more preferably 30% of a thickness of the electrode layer. The lower limit of the release layer thickness is determined by a particle diameter, etc. of a dielectric material able to be used for the release layer and is preferably 0.05 to 0.01 μm.

Preferably, a pressure at the time of bonding the electrode layer with a surface of the green sheet is 0.2 to 15 MPa, more preferably 0.2 to 6 MPa, and particularly preferably 1 to 3 MPa. Also, the temperature at pressing is preferably 40 to 100° C. or so, and more preferably 90° C. or lower. Furthermore, when a supporting sheet of the green sheet is an organic film, it is preferable that the temperature is not higher than the glass transition temperature of the organic film.

When the pressuring temperature is too low, it is liable that transfer becomes difficult, while when too high, it is liable that thermal deformation arises on the supporting sheet and it becomes difficult to transfer an electrode layer having a predetermined pattern to a green sheet with high accuracy. Also, when a pressuring force is too small, it is liable that transfer becomes difficult, while when too large, possibility of breaking the green sheet becomes high and unfavorable. Particularly, when a thickness of the green sheet is thin, it is preferable that the electrode layer can be bonded with a surface of the green sheet with a small pressuring force. Note that pressuring by a pair of rolls is preferable.

In the present invention, preferably, the electrode layer is formed on a surface of the release layer by a thick film method using an electrode paste. The thick film method is not particularly limited and a screen printing, etc. may be mentioned. Note that the film may be formed by a thin film method on the surface of the release layer. The thin film method is not particularly limited and the sputtering method, the vacuum evaporation method and the CVD method, etc. may be mentioned.

When forming an electrode layer by the thin film methods, a binder and plasticizer components evaporate in vacuum and the release layer on the surface of the first supporting sheet is damaged by sputtering particles and evaporated particles. However, this affects to reduce the release layer strength, so that it is preferable for transferring the electrode layer to the surface of the green sheet.

Note that, in the present invention, a material and a production method, etc. of the green sheet are not particularly limited, and a ceramic green sheet formed by the doctor blade method and a porous ceramic green sheet obtained by performing 2-dimensional drawing on a film formed by extrusion molding may be used.

Also, in the present invention, a concept of an electrode layer includes an electrode paste film to be an internal electrode layer after firing.

BRIEF DESCRIPTION OF DRAWINGS

Below, the present invention will be explained based on embodiments shown in drawings, wherein.

BEST MODE FOR CARRYING OUT THE INVENTION

Figure 1:
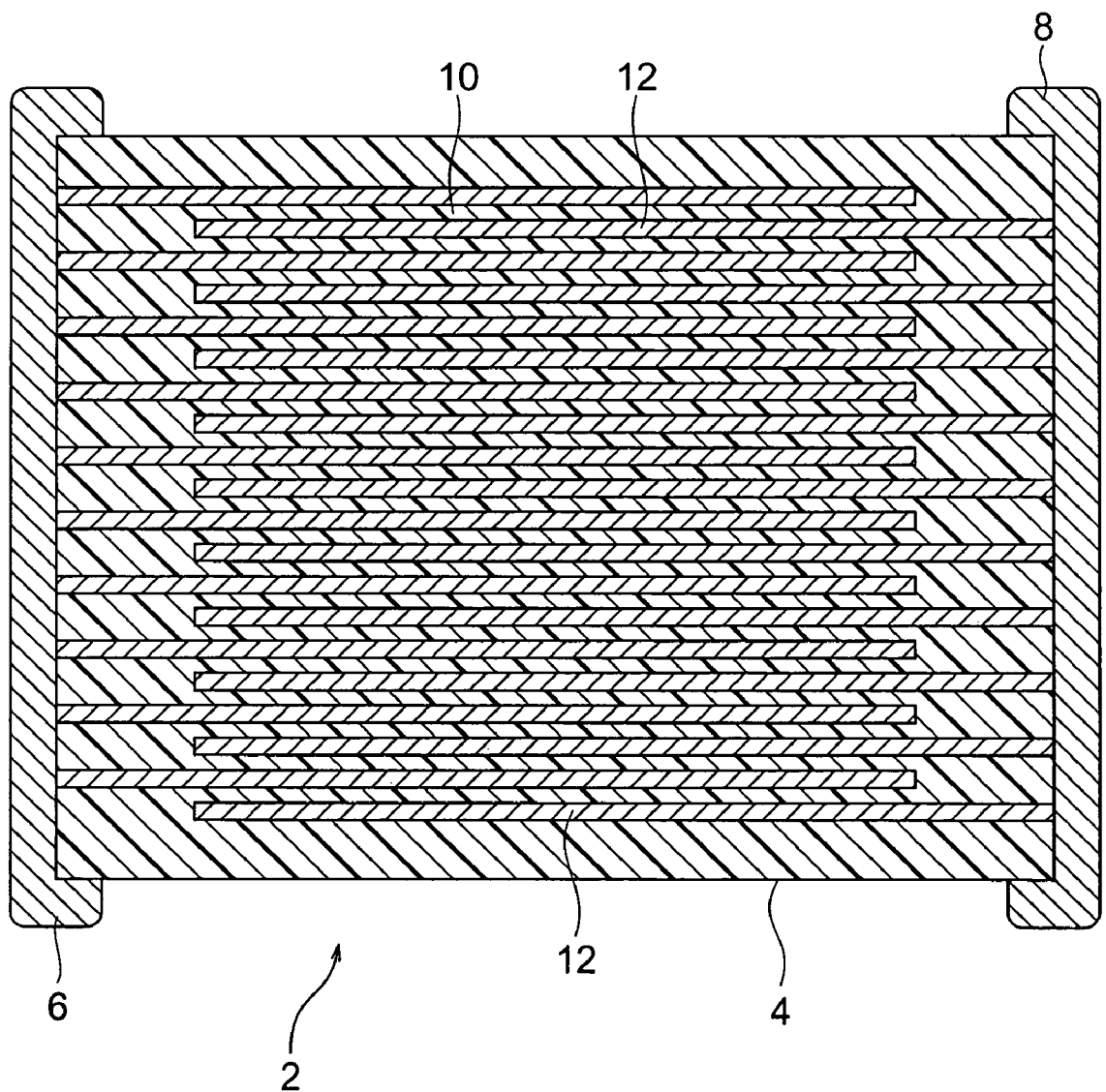
FIG. 1 is a schematic sectional view of a multilayer ceramic capacitor according to an embodiment of the present invention.

Below, the present invention will be explained in detail based on embodiments shown in the drawings.

First, as an embodiment of an electronic device produced by a method according to the present invention, an overall configuration of a multilayer ceramic capacitor will be explained.

As shown in FIG. 1, a multilayer ceramic capacitor 2 according to the present embodiment comprises a capacitor element 4, a first terminal electrode 6 and a second terminal electrode 8. The capacitor element 4 has dielectric layers 10 and internal electrode layers 12, and the internal electrode layers 12 are alternately stacked between the dielectric layers 10. One side of the alternately stacked internal electrode layers 12 is electrically connected to inside the first terminal electrode 6 formed outside of one end portion of the capacitor element body 4. Also, the other side of the alternately stacked internal electrode layers 12 is electrically connected to inside of the second terminal electrode 8 formed outside of the other end portion of the capacitor element body 4.

In the present embodiment, the internal electrode layer 12 is formed by transferring an electrode layer 12a to a ceramic green sheet 10a as shown in FIG. 2 to FIG. 6 and composed of the same material as that of the electrode layer 12a, and a thickness thereof is thicker than the electrode layer 12a exactly by an amount of contraction in the horizontal direction due to firing, which will be explained later on.

A material of the dielectric layer 10 is not particularly limited and formed by a dielectric material, such as calcium titanate, strontium titanate and/or barium titanate. A thickness of each dielectric layer 10 is not particularly limited but generally several µm to several hundreds of µm. Particularly, in the present embodiment, the layer is made thin as preferably 5 µm or thinner and more preferably 3 µm or thinner.

Also, a material of the terminal electrodes 6 and 8 is not particularly limited and normally copper, a copper alloy, nickel and nickel alloy, etc. are normally used and silver or silver alloy with palladium, etc. can be also used. Also, a thickness of the terminal electrodes 6 and 8 is not particularly limited and is normally 10 to 50 µm or so.

A shape and size of the multilayer ceramic capacitor 2 may be suitably determined in accordance with the use object. When the multilayer ceramic capacitor 2 is rectangular parallelepiped, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of a production method of the multilayer ceramic capacitor 2 according to the present embodiment will be explained.

(1) First, a dielectric paste is prepared to produce a ceramic green sheet to compose the dielectric layer 10 shown in FIG. 1 after firing.

The dielectric paste is normally composed of an organic solvent based paste obtained by kneading a dielectric material with an organic vehicle, or a water based paste.

The dielectric material may be suitably selected from a variety of compounds to be a composite oxide or oxide, such as carbonate, nitrate, hydroxide and organic metal compound, and mixed to be used. The dielectric material is normally used as particles having an average particle diameter of 0.1 to 3.0 µm or so. Note that it is preferable to use finer powder than a green sheet thickness to form an extremely thin green sheet.

The organic vehicle is obtained by dissolving a binder in an organic solvent. The binder used for the organic vehicle is not particularly limited and a variety of normal binders, such as ethyl cellulose, polyvinyl butyral, and an acrylic resin. Preferably, polyvinyl butyral and other butyral based resin are used.

Also, the organic solvent to be used for the organic vehicle is not particularly limited and an organic solvent, such as terpineol, butyl carbitol, acetone and toluene, is used. Also, the vehicle in the water based paste is obtained by dissolving a water-soluble binder in water. The water-soluble binder is not particularly limited and polyvinyl alcohol, methyl cellulose, hydroxyl ethyl cellulose, a water-soluble acrylic resin, and emulsion, may be used. A content of each component in the dielectric paste is not particularly limited and may be a normal content, for example, the binder by 1 to 5 wt % or so and the solvent (or water) by 10 to 50 wt % or so.

The dielectric paste may include additives selected from a variety of dispersants, plasticizers, dielectrics, glass flits and insulators. Note that a total content of these is preferably 10 wt % or smaller. When using a butyral based resin as a binder resin, a content of a plasticizer is preferably 25 to 100 parts by weight with respect to 100 parts by weight of the binder resin. When the plasticizer is too little, the green sheet tends to become brittle, while when too much, the plasticizer exudes to decline the handlability.

Figure 3A:
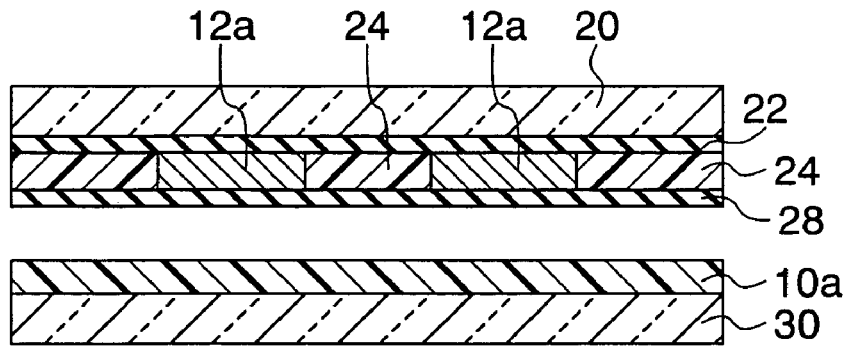

By using the dielectric paste, a green sheet 10a is formed to be a thickness of preferably 0.5 to 30 μm, and more preferably 0.5 to 10 μm or so on a carrier sheet 30 as a second supporting sheet as shown in FIG. 3A by the doctor blade method, etc. The green sheet 10a is dried after being formed on the carrier sheet 30. The drying temperature of the green sheet 10a is preferably 50 to 100° C. and the drying time is preferably 1 to 20 minutes. A thickness of the green sheet 10a after drying is reduced to 5 to 25% of a thickness before drying.

Figure 2A:
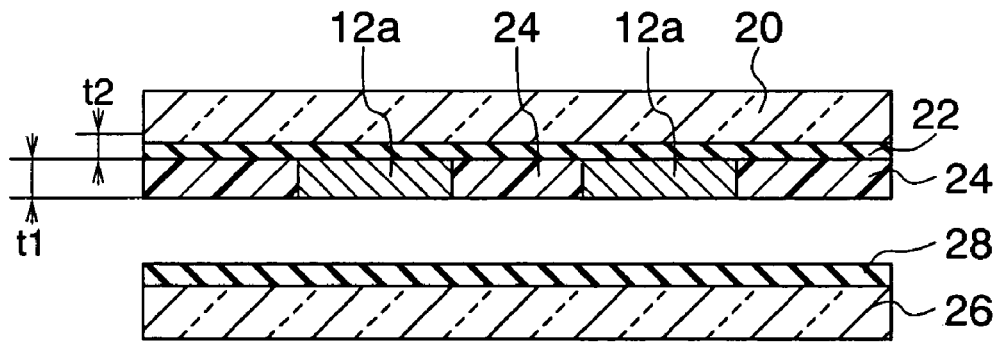
FIG. 2A to FIG. 2C and FIG. 3A to FIG. 3C are sectional views of a key part showing a transfer method of an electrode layer.

(2) A carrier sheet 20 as a first supporting sheet is prepared separately from the above carrier sheet 30 as shown in FIG. 2A, a release layer 22 is formed thereon, an electrode layer 12a having a predetermined pattern is formed thereon, and adjacent thereto, a blank pattern layer 24 having substantially the same thickness as that of the electrode layer 12a is formed on a surface of the release layer 22 not formed with the electrode layer 12a.

As the carrier sheets 20 and 30, for example, a PET film, etc. is used, which is preferably coated with silicon, etc. to improve the releasability. A thickness of the carrier sheets 20 and 30 is not particularly limited and preferably 5 to 100 μm. Thicknesses of the carrier sheets 20 and 30 may be the same or different.

The release layer 22 preferably includes the same dielectric particles as that in the dielectrics composing the green sheet 10a shown in FIG. 3A. Also, the release layer 22 includes a binder, plasticizer and, optionally, a release agent other than the dielectric particles. A particle diameter of the dielectric particles may be the same as that of the dielectric particles included in the green sheet, but is preferably smaller.

In the present embodiment, a thickness t2 of the release layer 22 is preferably thinner than a thickness of the electrode layer 12a and is set to have a thickness of preferably 60% or less, and more preferably 30% or less.

The coating method of the release layer 22 is not particularly limited but a coating method using, for example, a wire bar coater is preferable because it is necessary to form it extremely thin. Note that adjustment of the thickness of the release layer can be made by selecting a wire bar coater having a different wire diameter. Namely, to make the thickness of the release layer to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or emulsion. The binder contained in the release layer 22 may be the same as the binder contained in the green sheet 10a or may be different from that, but preferably the same.

A plasticizer for the release layer 22 is not particularly limited and, for example, phthalate ester, adipic acid, phosphate ester and glycols, etc. may be mentioned. The plasticizer to be contained in the release layer 22 may be the same as that contained in the green sheet 10a or may be different from that.

A release agent for the release layer 22 is not particularly limited and, for example, paraffin, wax and silicone oil, etc. may be mentioned. A release agent contained in the release layer 22 may be the same as that contained in the green sheet 10a or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle.

A plasticizer is preferably contained in the release layer 22 by 0 to 200 parts by weight, preferably 20 to 200 parts by weight, and more preferably 50 to 100 parts by weight with respect to 100 parts by weight of the binder.

A release agent is preferably contained in the release layer 22 by 0 to 100 parts by weight, preferably 2 to 50 parts by weight, and more preferably 5 to 20 parts by weight with respect to 100 parts by weight of the binder.

After forming the release layer 22 on the surface of the carrier sheet 30, as shown in FIG. 2A, an electrode layer 12a to compose an internal electrode layer 12 after firing is formed to be a predetermined pattern on the surface of the release layer 22. A thickness of the electrode layer 12a is preferably 0.1 to 2 μm, and more preferably 0.1 to 1.0 μm or so. The electrode layer 12a may be configured by a single layer or two or more layers having different compositions.

The electrode layer 12a can be formed on the surface of the release layer 22 by a thick film formation method, such as a printing method using an electrode paste, or a thin film method, such as evaporation and sputtering. When forming the electrode layer 12a on the surface of the release layer 22 by a screen printing method or a gravure printing method as a kind of thick film method, it is as follows.

First, an electrode paste is prepared. The electrode paste is fabricated by kneading a conductive material composed of a variety of conductive metals and alloys, or a variety of oxides, organic metal compounds or resinates, etc. to be conductive materials after firing, with an organic vehicle.

As a conductive material to be used when producing the electrode paste, Ni, a Ni alloy and a mixture of these are used. A shape of the conductive materials is not particularly limited and may be a spherical shape and scale-like shape, etc. or a mixture of these shapes. Those having an average particle diameter of the conductive material of normally 0.1 to 2 μm, and preferably 0.2 to 1 μm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Particularly, butyrals, such as polyvinyl butyral, are preferable.

The binder is contained in the electrode paste by preferably 4 to 20 parts by weight with respect to 100 parts by weight of the conductive material (metal powder). As a solvent, any of well-known ones, such as terpineol, butylcarbitol and kerosene, may be used. A content of the solvent is preferably 20 to 55 wt % or so with respect to the entire paste.

To improve the adhesiveness, the electrode paste preferably contains a plasticizer. As a plasticizer, benzylbutyl phthalate (BBP) and other phthalate esters, adipic acids, phosphoric esters, and glycols, etc. may be mentioned. The plasticizer in the electrode paste is preferably 10 to 300 parts by weight, and more preferably 10 to 200 parts by weight with respect to 100 parts by weight of the binder. Alternately, the electrode paste is added with an acrylic binder (lauryl methacrylate, ethylhexyl methacrylate, lauryl acrylate, ethylhexyl acrylate and butyl acrylate, etc.) having a glass transition temperature Tg of not higher than the room temperature is added preferably by 10 to 100 parts by weight with respect to 100 parts by weight of the binder. Furthermore, in the same way, an adhesive may be added to the electrode paste by 100 parts by weight or less with respect to 100 parts by weight of the binder. Note that when an adding quantity of the plasticizer or adhesive is too large, strength of the electrode layer 12a tends to decline remarkably. Also, to improve transferability of the electrode layer 12a, it is preferable to improve adhesiveness and/or adherence of the electrode paste by adding a plasticizer and/or adhesive to the electrode paste.

The adhesive is not particularly limited and, for example, butyl acrylate (BA), 2-ethylhexyl acrylate (2HEA) and lauryl methacrylate (RMA) may be mentioned.

After or before forming the electrode paste layer having a predetermined pattern on the surface of the release layer 22 by a printing method, a blank pattern layer 24 is formed to be substantially the same thickness as that of the electrode layer 12a on the surface of the release layer 22 not formed with the electrode layer 12a. The blank pattern layer 24 is composed of the same material as that of the green sheet 10a shown in FIG. 3A and formed by the same method. The electrode layer 12a and the blank pattern layer 24 are dried in accordance with need. The drying temperature is not particularly limited, but is preferably 70 to 120° C., and the drying time is preferably 5 to 15 minutes.

(3) As shown in FIG. 2A, an adhesive layer transfer sheet formed with an adhesive layer 28 is prepared on the surface of a carrier sheet 26 as a third supporting sheet separately from the carrier sheets 20 and 30 explained above. The carrier sheet 26 is formed by the same sheet as that of the carrier sheets 20 and 30.

A composition of the adhesive layer 28 is the same as that of the release layer 22 except for not containing dielectric particles. Namely, the adhesive layer 28 contains a binder, a plasticizer and a release agent. The adhesive layer 28 may contain the same dielectric particles as that of the dielectrics composing the green sheet 10a, however, in the case of forming an adhesive layer having a thinner thickness than a particle diameter of the dielectric particles, it is better not to contain dielectric particles. Also, when dielectric particles are contained in the adhesive layer 28, a ratio of the dielectric particles with respect to the binder weight is preferably smaller than a ratio of the dielectric particles contained in the green sheet with respect to the binder weight.

The binder and a plasticizer for the adhesive layer 28 are preferably the same as those in the release layer 22, but it may be different from them.

A plasticizer is preferably contained in the adhesive layer 28 by 0 to 200 parts by weight, preferably 20 to 200 parts by weight, and more preferably 20 to 100 parts by weight with respect to 100 parts by weight of the binder.

A thickness of the adhesive layer 28 is preferably 0.02 to 0.3 µm or so. When a thickness of the adhesive layer 28 is too thin, the adhesive force declines, while when too thick, it is liable to cause a defect (spaces).

The adhesive layer 28 is formed on the surface of the carrier sheet 26 as a third supporting sheet, for example, by a bar coater method, die coater method, reverse coater method, dip coater method and kiss coater method, etc. and dried in accordance with need. The drying temperature is not particularly limited, but is preferably the room temperature to 80° C., and the drying time is preferably 1 to 5 minutes.

Figure 2B:
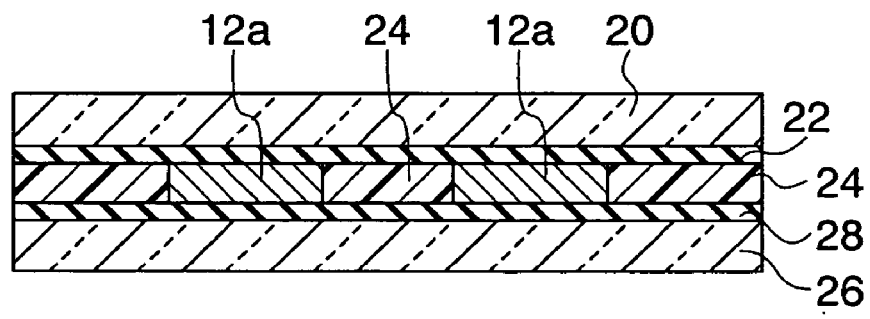
Figure 2C:
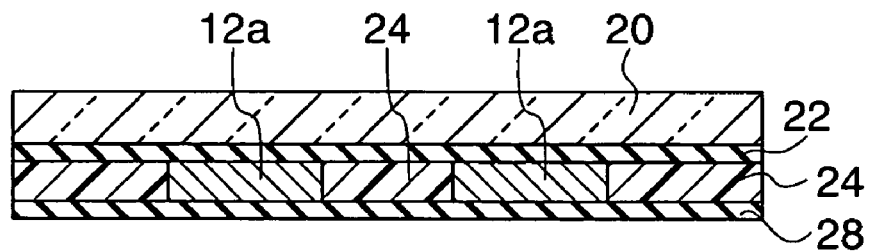

(4) To form the adhesive layer on the surface of the electrode layer 12a and the blank pattern layer 24 shown in FIG. 2A, a transfer method is applied in the present embodiment. Namely, as shown in FIG. 2B, the adhesive layer 28 of the carrier sheet 26 is pressed against the surface of the electrode layer 12a and the blank pattern layer 24, heated and pressed, then, the carrier sheet 26 is removed. Consequently, as shown in FIG. 2C, the adhesive layer 28 is transferred to the surface of the electrode layer 12a and the blank pattern layer 24.

The heating temperature at that time is preferably 40 to 100° C., and the pressing force is preferably 0.2 to 15 MPa. Pressing may be performed by a press or a calendar roll, but is preferably performed by a pair of rolls.

Figure 3B:
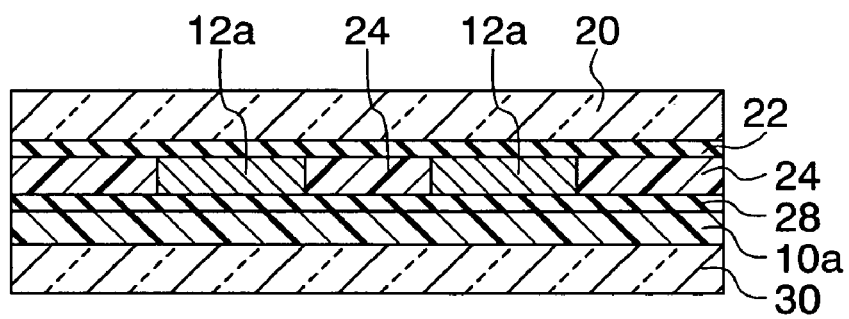
Figure 3C:
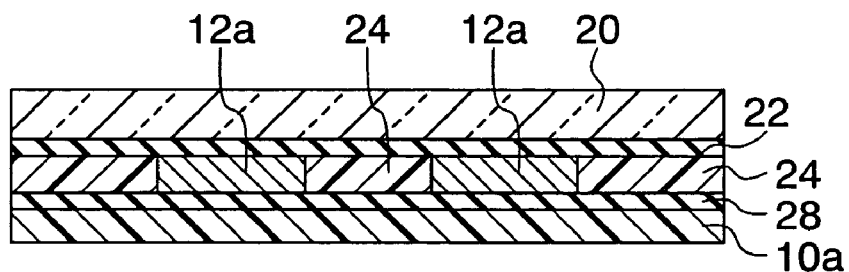

After that, the electrode layer 12a is bonded with the surface of the green sheet 10a formed on the surface of the carrier sheet 30 shown in FIG. 3A. For that purpose, as shown in FIG. 3B, the electrode layer 12a and the blank pattern layer 24 of the carrier sheet 20 are pressed against the surface of the green sheet 10a together with the carrier sheet 20 via the adhesive layer 28, heated and pressed. As a result, as shown in FIG. 3C, the electrode layer 12a and the blank pattern layer 24 are transferred to the surface of the green sheet 10a. Note that since the carrier sheet 30 on the green sheet side is peeled off, when seeing from the green sheet 10a side, the green sheet 10a is transferred to the electrode layer 12a and the blank pattern layer 24 via the adhesive layer 28.

Heating and pressing at the time of transferring may be pressing and heating by a press or by a calendar roll, but is preferably performed by a pair of rolls. The heating temperature and the pressing force are same as those at the time of transferring the adhesive layer 28.

A single-layer electrode layer 12a having a predetermined pattern is formed on the single green sheet 10a by steps shown in FIG. 2A to FIG. 3C. A green sheet 10a formed with the electrode layer 12a is stacked, for example, by repeating the steps shown in FIG. 4A to FIG. 6C. Note that, in FIG. 4A to FIG. 6C, the same reference numbers are given to common members with those shown in FIG. 3A to FIG. 4C, and an explanation thereon is partially omitted.

Figure 4A:
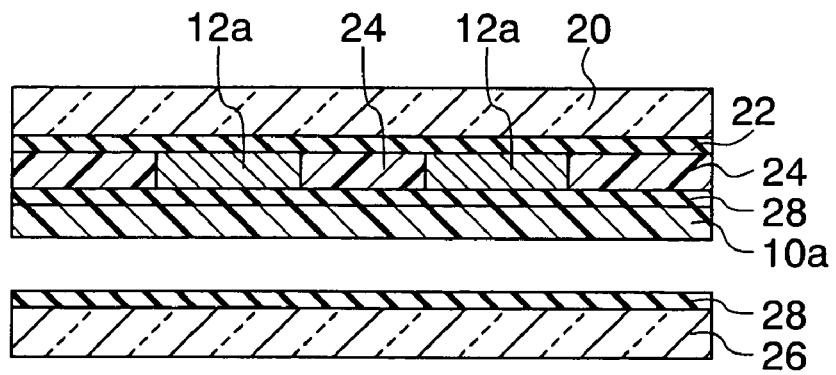
FIG. 4A to FIG. 4C, FIG. 5A to FIG. 5C and FIG. 6A to FIG. 6C are sectional views of a key part showing a stacking method of a green sheet bonded with an electrode layer.
Figure 4B:
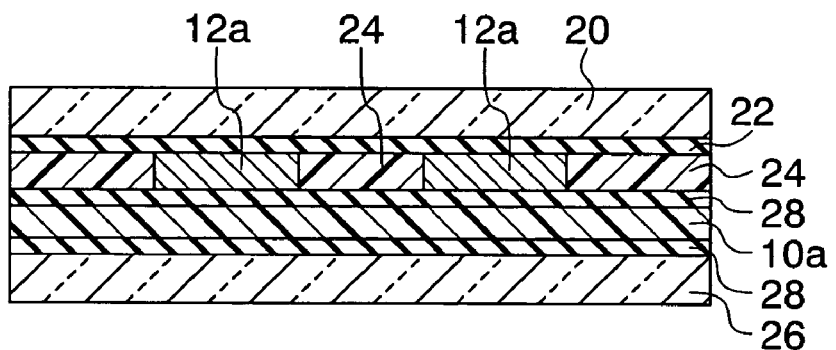
Figure 4C:
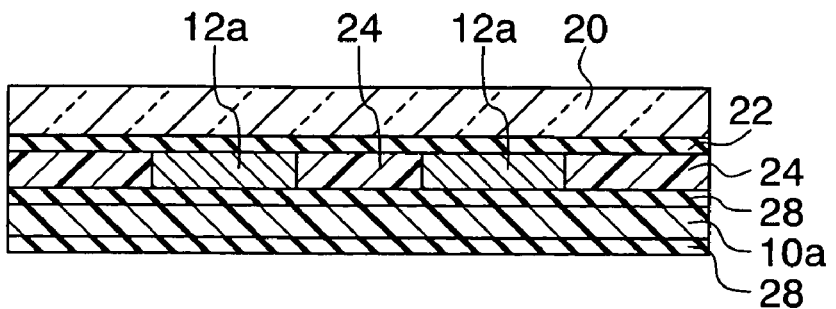
Figure 5A:
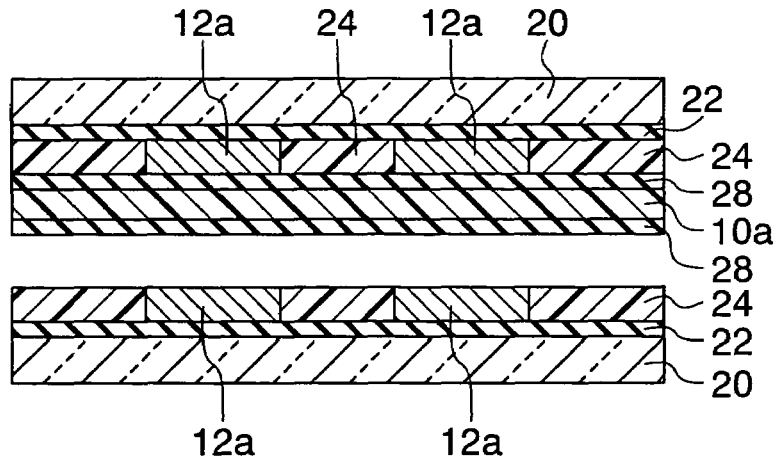
Figure 5B:
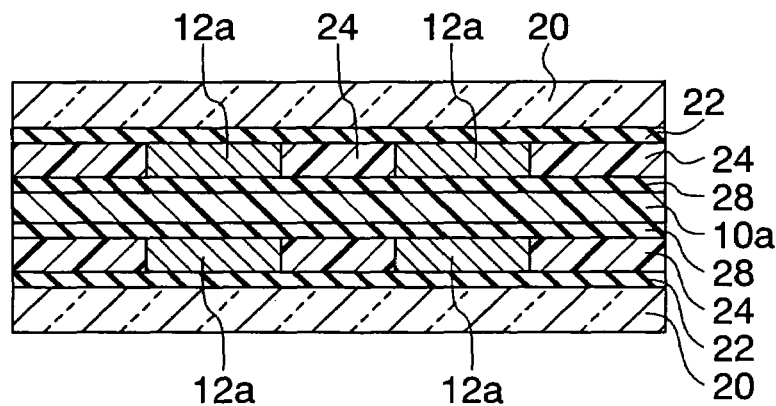
Figure 5C:
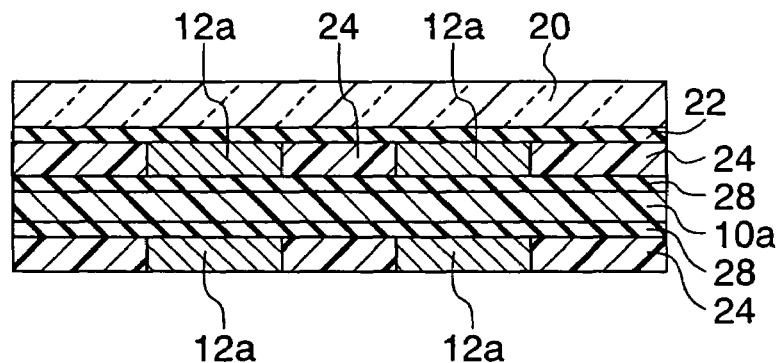

First, as shown in FIG. 4A to FIG. 4C, the adhesive layer 28 is transferred to the surface on the other side of the electrode layer (back side) on the green sheet 10a. After that, as shown in FIG. 5A to FIG. 5C, the electrode layer 12a and the blank pattern layer 24 are transferred to the back side of the green sheet 10a via the adhesive layer 28.

Figure 6A:
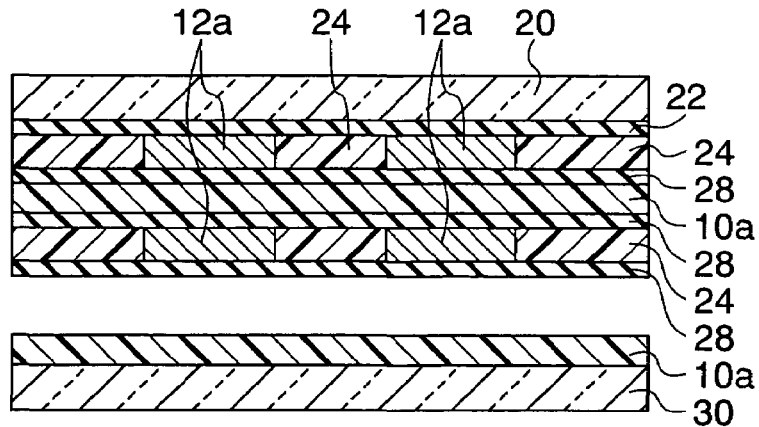
Figure 6B:
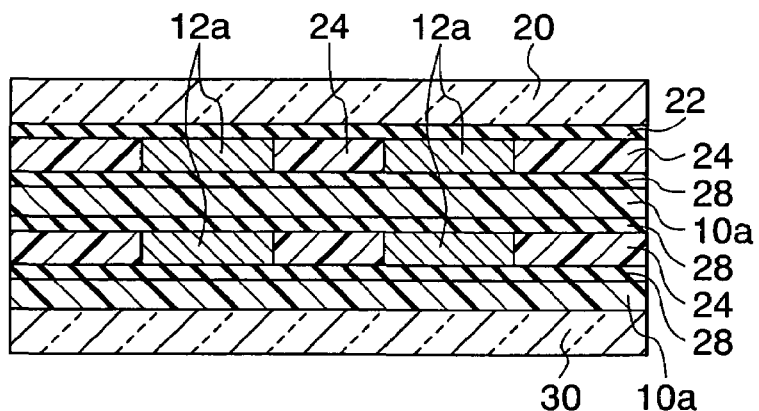
Figure 6C:
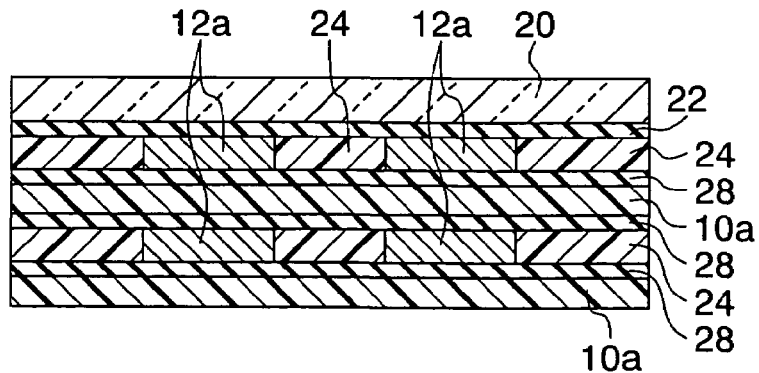

Next, as shown in FIG. 6A to FIG. 6C, on the surface of the electrode layer 12a and the blank pattern layer 24, the green sheet 10a is transferred via the adhesive layer 28. After that, by repeating the transfer, a multilayer body, wherein a large number of electrode layers 12a and the green sheet 10a are alternately stacked, is obtained.

Then, after performing final pressing on the stacked body, the carrier sheet 20 is peeled off. Pressure at the time of the final pressing is preferably 10 to 200 MPa. The heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 400° C., particularly 250 to 350° C.

holding time: 0.5 to 20 hours, particularly 1 to 10 hours atmosphere: a wet mixed gas of $N_2$ and $H_2$ A firing condition is preferably as below.

temperature rising rate: 50 to 500° C./hour, particularly 200 to 300° C./hour holding temperature: 1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a wet mixed gas of $N_2$ and $H_2$, etc.

Note that oxygen partial pressure in an atmosphere in the air at firing is preferably $10^{-2}$ Pa or lower, particularly $10^{-2}$ to $10^{-8}$ Pa. When exceeding the above ranges, the internal electrode layer tends to oxidize, while when the oxygen partial pressure is too low, it is liable that abnormal sintering is caused in an electrode material of the internal electrode layer to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than that in a reducing atmosphere at the time of firing, preferably $10^{-3}$ Pa to 1 Pa, and more preferably $10^{-2}$ Pa to 1 Pa. When it is lower than the above range, re-oxidization of the dielectric layer 2 becomes difficult, while when exceeding the above ranges, the internal electrode layer 3 tends to oxidize. Other condition of the thermal treatment is preferably as below.

holding time: 0 to 6 hours, particularly 2 to 5 hours cooling rate: 50 to 500° C./hour, particularly 100 to 300° C./hour atmosphere gas: wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a $N_2$ gas or a wet $N_2$ gas, the atmosphere is changed, and the temperature is furthermore raised. After that, after cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode paste is burnt to form terminal electrodes 6 and 8. For example, a firing condition of the terminal electrode paste is preferably in a wet mixed gas of $N_2$ and $H_2$ at 600 to 800° C. for 10 minutes to 1 hour or so. In accordance with need, soldering, etc. is performed on the terminal electrodes 6 and 8 to form a pad layer. Note that the terminal electrode paste may be fabricated in the same way as the electrode paste explained above.

A multilayer ceramic capacitor of the present invention produced as above is mounted on a print substrate, etc. by soldering, etc. and used for a variety of electronic equipments, etc.

In a method of producing a multilayer ceramic capacitor according to the present embodiment, it is possible to easily transfer a dry type electrode layer 12a to a surface of the green sheet 10a with high accuracy without breaking or deforming the green sheet 10a.

Particularly, in the production method of the present embodiment, the adhesive layer 28 is formed on the surface of the electrode layer or green sheet by the transfer method, and the electrode layer 12a is bonded with the surface of the green sheet 10a via the adhesive layer 28. By forming the adhesive layer 28, a high pressure and heat become unnecessary at the time of bonding the electrode layer 12a to transfer to the surface of the green sheet 10a, so that bonding at a lower pressure and lower temperature becomes possible. Accordingly, even in the case of an extremely thin green sheet 10a, the green sheet 10a is not broken, the electrode layers 12a and green sheets 10a can be preferably stacked, and short-circuiting defect, etc. are not caused.

Also, for example, by making an adhesive force of the adhesive layer 28 stronger than that of the release layer 22 and making an adhesive force of the release layer 22 stronger than that between the green sheet 10a and the carrier sheet 30, etc., the carrier sheet 30 on the green sheet 10a side can be selectively released easily.

Furthermore, in the present embodiment, the adhesive layer 28 is not directly formed on a surface of the electrode layer 12a or green sheet 10a by a coating method, etc. and formed by a transfer method, so that components of the adhesive layer 28 do not soak in the electrode layer 12a or green sheet 10a, and it becomes possible to form an extremely thin adhesive layer 28. For example, a thickness of the adhesive layer 28 can be made thin as 0.02 to 0.3 μm or so. Although the thickness of the adhesive layer 28 is thin, components of the adhesive layer 28 do not soak in the electrode layer 12a and green sheet 10a, the adhesive force is sufficient and a composition of the electrode layer 12a or green sheet 10a is not adversely affected.

Note that the present invention is not limited to the above embodiments and may be variously modified within the scope of the present invention.

For example, the method of the present invention is not limited to the production method of the multilayer ceramic capacitor but can be applied as a production method of other multilayer electronic device including an internal electrode.

Below, the present invention will be explained based on further detailed examples, but the present invention is not limited to the examples.

EXAMPLE 1

First, each paste below was prepared.
Green Sheet Paste (as same as Blank Pattern Paste)

Powders selected from $BaTiO_3$ powder (BT-02 made by Sakai Chemical Industry Co., Ltd.), $MgCO_3$, $MnCO_3$, $(Ba_{0.6}Ca_{0.4})SiO_3$ and rare earths ($Gd_2O_3$, $Tb_4O_7$, $Dy_2O_3$, $Ho_2O_3$, $Er_2O_3$, $Tm_2O_3$, $Yb_2O_3$, $Lu_2O_3$, and $Y_2O_3$) were wet mixed by a ball mill for 16 hours and dried to obtain a dielectric material. An average particle diameter of the material powders was 0.1 to 1 µm.

$(Ba_{0.6}Ca_{0.4})SiO_3$ was produced by wet mixing $BaCO_3$, $CaCO_3$ and $SiO_2$ by a ball mill for 16 hours, dried and fired at 1150° C. in the air, and wet grinding the result for 100 hours by a ball mill.

To make the dielectric material paste, an organic vehicle was added to the dielectric material and mixed by a ball mill and a dielectric green sheet paste was obtained. The organic vehicle has a blending ratio of 6 parts by weight of polyvinyl butyral as a binder, 3 parts by weight of bis(2-ethylhexyl) phthalate (DOP), 55 parts by weight of ethyl acetate and 10 parts by weight of toluene as a plasticizer, and 0.5 part by weight of paraffin as a release agent with respect to 100 parts by weight of the dielectric material.

Release Layer Paste

A release layer paste was obtained by diluting the above dielectric green sheet paste by ethanol/toluene (55/10) with 2 times at a weight ratio.

Adhesive Layer Paste

The above dielectric green sheet paste, but not containing the dielectric particles and release agent, was diluted by toluene with 4 times at the weight ratio and used as an adhesive layer paste.

Internal Electrode Paste (Electrode Layer Paste to be Transferred)

Next, an internal electrode paste was obtained by kneading a material having the blending ratio below by a three-roll to make slurry. Namely, 100 parts by weight of Ni particles having an average particle diameter of 0.4 µm were added with 40 parts by weight of an organic vehicle (obtained by dissolving 8 parts by weight of a polyvinyl butyral resin as a binder in 92 parts by weight of terpineol) and 10 parts by weight of terpineol, and kneaded by a three-roll and made to be slurry, so that an internal electrode paste was obtained.

Production of Blank Pattern Layer Printing Paste

The same ceramic powder and subcomponent additives as those used for the green sheet paste were prepared to have the same blending ratio.

The ceramic powder and subcomponent additives (150 g) was added with an ester based polymer dispersant (1.5 g), terpineol (5 g) and acetone (60 g), and dioctyl phthalate (5 g) as a plasticizer and mixed for four hours. Next, the mixture is added with 8% lacquer (8 wt % of polyvinyl butyral and 92 wt % of terpineol with respect to the total amount of the lacquer) of BH6 made by Sekisui Chemical Co., Ltd. (a polyvinyl butyral resin having a polymerization degree of 1450 and butylaration degree of 69 mol %±3%) by an amount of 120 g and mixed for 16 hours. After that, acetone as an excess solvent was removed and terpineol was added by 40 to 100 g for adjusting the viscosity, so that a paste was produced.

Formation of Green Sheet and Transfer of Adhesive Layer and Electrode Layer

First, by using the above dielectric green sheet paste, a green sheet having a thickness of 1.0 µm was formed on a PET film (second supporting sheet) by using a wire bar coater. Next, the above release layer paste was applied to another PET film (first supporting sheet) by a wire bar coater and dried to form a release layer of 0.2 µm.

On the surface of the release layer, an electrode layer 12a and a blank pattern layer 24 were formed. The electrode layer 12a was formed to be a thickness of 1.2 µm by the printing method using the above internal electrode paste. The blank pattern layer 24 was formed to be a thickness of 1.2 µm by the printing method using the above dielectric green sheet paste.

Also, an adhesive layer 28 was formed on another PET film (third supporting sheet). The adhesive layer 28 was formed to be a thickness of 0.1 µm by using the above adhesive layer paste by a wire bar coater.

First, on the surface of the electrode layer 12a and the blank pattern layer 24, the adhesive layer 28 was transferred by the method shown in FIG. 2. At the time of transferring, a pair of rolls were used, the pressing force was 1 MPa and the temperature was 80° C. It was confirmed that the transfer was preferably performed.

Next, by the method shown in FIG. 3, the internal electrode layer 12a and the blank pattern layer 24 were bonded with (transferred to) the surface of the green sheet 10a via the adhesive layer 28. At the time of transferring, a pair of rolls were used, the pressing force was 1 MPa and the temperature was 80° C. It was confirmed that the transfer was preferably performed.

Next, by the method shown in FIG. 4 to FIG. 6, the internal electrode layers 12a and green sheets 10a were successively stacked and, finally, it was possible to stack 5 internal electrode layers 12a.

Transferring was performed respectively on 20 same samples, and a ratio (good product rate) of those without any cracks and pinholes on the transferred electrode layer and breaking on the green sheet was measured. 95% or higher was determined ⊚, 60 to 95% was determined o, and 60% or lower was determined x. The results are shown in Table 1. Note that when determining the good product rate, deformation of the supporting sheet (PET sheet) was also evaluated and deformed ones were evaluated defective.

TABLE 1

|  | Pressing Force (MPa) | Pressing Temperature (° C.) | Green Sheet Thickness (µm) | Adhesive Layer Thickness (µm) | Transferability | Good Product Ratio n = 20(%) |
|---|---|---|---|---|---|---|
| Example 1 | 1 | 80 | 1.0 | 0.1 | ⊚ | 100 |
| Example 2 | 0.2 | 80 | 1.0 | 0.1 | ◯ | 65 |
| Example 2 | 0.5 | 80 | 1.0 | 0.1 | ⊚ | 95 |
| Example 2 | 2 | 80 | 1.0 | 0.1 | ⊚ | 100 |
| Example 2 | 5 | 80 | 1.0 | 0.1 | ◯ | 90 |
| Example 2 | 10 | 80 | 1.0 | 0.1 | ◯ | 90 |
| Example 2 | 15 | 80 | 1.0 | 0.1 | ◯ | 80 |
| Example 3 | 0.5 | 40 | 1.0 | 0.1 | ◯ | 65 |
| Example 3 | 0.5 | 50 | 1.0 | 0.1 | ◯ | 80 |
| Example 3 | 0.5 | 60 | 1.0 | 0.1 | ⊚ | 95 |
| Example 3 | 0.5 | 70 | 1.0 | 0.1 | ⊚ | 100 |

TABLE 1-continued

| | Pressing Force (MPa) | Pressing Temperature (° C.) | Green Sheet Thickness (μm) | Adhesive Layer Thickness (μm) | Transferability | Good Product Ratio n = 20(%) | |
|---|---|---|---|---|---|---|---|
| Example 3 | 0.5 | 90 | 1.0 | 0.1 | ◎ | 95 | |
| Example 3 | 0.5 | 100 | 1.0 | 0.1 | ○ | 85 | |
| Example 3 | 1 | 120 | 1.0 | 0.1 | X | 50 | |
| Comparative Example 2 | 15 | 100 | 1.0 | 0.1 | X | 0 | |
| Example 4 | 1 | 80 | 1.0 | 0.1 | ○ | 75 | |
| Example 5 | 1 | 80 | 1.0 | 0.1 | ○ | 65 | |
| Example 6 | 1 | 80 | 1.0 | 0.1 | ○ | 65 | |
| Example 7 | 1 | 80 | 1.0 | 0.01 | X | 10 | |
| Example 7 | 1 | 80 | 1.0 | 0.05 | ○ | 60 | |
| Example 7 | 1 | 80 | 1.0 | 0.3 | ◎ | 100 | |
| Example 7 | 1 | 80 | 1.0 | 0.5 | ◎ | 100 | *1 |

*1: Crackes were observed on sintered body after stacking 30 layers and firing.

EXAMPLE 2

Other than changing the pressing force at the time of transferring in a range of 0.2 to 15 MPa, an internal electrode layer 12a and blank pattern layer 24 were bonded with (transferred to) a surface of the green sheet 10a in the same way as in the example 1. Transferability was evaluated in the same way as in the example 1. The results are shown in Table 1.

As shown in Table 1, it was confirmed that the pressing force at the time of transferring is preferably 0.2 to 15 MPa, more preferably 0.2 to 6 MPa and particularly preferably 1 to 3 MPa.

EXAMPLE 3

Other than changing the heating temperature at the time of transferring in a range of 40 to 120° C., an internal electrode layer 12a and blank pattern layer 24 were bonded with (transferred to) a surface of the green sheet 10a in the same way as in the example 1. Transferability was evaluated in the same way as in the example 1. The results are shown in Table 1.

As shown in Table 1, it was confirmed that the temperature at the time of transferring was preferably 40 to 100° C. or so, and more preferably 90° C. or lower and 60° C. or higher.

Comparative Example 1

Other than not forming the adhesive layer 28, the internal electrode layer 12a and the blank pattern layer 24 were bonded with (transferred to) the surface of the green sheet 10a in the same way as in the example 1.

Transferring was not attained at all and 20 same samples came unstuck.

Comparative Example 2

Other than not forming the adhesive layer 28 and changing the pressing force to 15 MPa and the temperature to 100° C. at the time of bonding (transferring) the internal electrode layer 12a and the blank pattern layer 24 with a surface of the green sheet 10a, the internal electrode layer 12a and the blank pattern layer 24 were bonded with (transferred to) the surface of the green sheet 10a in the same way as in the example 1.

Results of evaluating transferability in the same way as in the example 1 are shown in Table 1. As shown in Table 1, when the adhesive layer 28 is not formed, it was confirmed that the transferability was poor even though the pressing force was increased.

Comparative Example 3

Other than forming the adhesive layer 28 to be a thickness of 0.1 μm directly on the surface of the electrode layer 12a and the blank pattern layer 24 by a wire bar coater, the internal electrode layer 12a and the blank pattern layer 24 were bonded with (transferred to) the surface of the green sheet 10a in the same way as in the example 1.

Components of the adhesive layer soaked in the electrode layer or green sheet and adhesiveness on the surface was not able to be improved, so that transfer was not attained. Namely, it was confirmed that the transferability was unable to be improved when the adhesive layer was formed by a method other than the transfer method.

EXAMPLE 4

Other than replacing the binder resin of the adhesive layer paste by an acrylic resin, the internal electrode layer 12a and the blank pattern layer 24 were bonded with (transferred to) the surface of the green sheet 10a in the same way as in the example 1.

The results of evaluating transferability in the same way as in the example 1 are shown in Table 1. As shown in Table 1, it was confirmed that the transferability was a little inferior to that in the example 1 but was still preferable.

EXAMPLE 5

Other than replacing the binder resin of the adhesive layer paste by an ethyl cellulose resin, the internal electrode layer 12a and the blank pattern layer 24 were bonded with (transferred to) the surface of the green sheet 10a in the same way as in the example 1.

The results of evaluating transferability in the same way as in the example 1 are shown in Table 1. As shown in Table 1, it was confirmed that the transferability was a little inferior to that in the example 1 but was still preferable.

EXAMPLE 6

Other than replacing the binder resin of the blank layer paste by an ethyl cellulose resin, the internal electrode layer 12a and the blank pattern layer 24 were bonded with (transferred to) the surface of the green sheet 10a in the same way as in the example 1.

The results of evaluating transferability in the same way as in the example 1 are shown in Table 1. As shown in Table 1, it was confirmed that the transferability was a little inferior to that in the example 1 but was still preferable.

EXAMPLE 7

Other than changing the thickness of the adhesive layer to 0.01 to 0.5 µm, the internal electrode layer 12a and the blank pattern layer 24 were bonded with (transferred to) the surface of the green sheet 10a in the same way as in the example 1.

The results of evaluating transferability in the same way as in the example 1 are shown in Table 1. Note that, in Table 1, the transferability was preferable when the thickness of the adhesive layer by the transfer method was 0.5 µm, but cracks were observed on a fired body when 30 layers were stacked and fired. On the other hand, when the adhesive layer was 0.3 µm or thinner, cracks were not observed on a fired body when 30 layers were stacked and fired.

From the above results, as shown in Table 1, it was confirmed that the thickness of the adhesive layer formed by the transfer method was preferably 0.02 to 0.3 µm, and more preferably 0.1 to 0.3 µm.

The invention claimed is:

1. A production method of an electronic device having an internal electrode, comprising the steps of:
    forming a release layer on a surface of a first supporting sheet;
    forming an electrode layer on a surface of said release layer;
    pressing said electrode layer against a surface of a green sheet to bond said electrode layer with the surface of said green sheet; said green sheet comprising dielectrics and binder resin
    stacking the green sheets bonded with said electrode layer to form a green chip; and
    firing said green chip;
    wherein
    before pressing said electrode layer against the surface of said green sheet, an adhesive layer is formed on a surface of said electrode layer or a surface of said green sheet by a transfer method; and
    said release layer includes substantially the same dielectrics as those composing said green sheet and substantially the same binder resin as that included in said green sheet.

2. The production method of an electronic device having an internal electrode as set forth in claim 1, wherein:
    to form said green chip, a step of pressing another electrode layer to be bonded against the other side of the green sheet opposite that having the electrode layer so as to bond the electrode layer via an adhesive layer formed by the transfer method, and a step of pressing the electrode layer against another green sheet so as to bond via an adhesive layer formed by the transfer method are repeated.

3. The production method of an electronic device having an internal electrode as set forth in claim 1, wherein:
    to form said green chip, a step of pressing another green sheet to be bonded against a surface on the electrode layer side of the green sheet bonded with said electrode layer so as to bond the green sheet via an adhesive layer formed by the transfer method, and a step of pressing another electrode layer against the green sheet so as to bond via an adhesive layer formed by the transfer method are repeated.

4. The production method of an electronic device having an internal electrode as set forth in claim 1, wherein
    said green sheet is formed on a surface of a second supporting sheet in a releasable way and, after said electrode layer is bonded with a surface of said green sheet, said second supporting sheet is released from the surface of said green sheet.

5. The production method of an electronic device having an internal electrode as set forth in claim 1, wherein
    said adhesive layer is formed on a surface of a third supporting sheet in a releasable way first and pressed against a surface of said green sheet or a surface of said electrode layer so as to be bonded.

6. The production method of an electronic device having an internal electrode as set forth in claim 1, wherein a thickness of said adhesive layer is 0.02 to 0.3 µm.

7. The production method of an electronic device having an internal electrode as set forth in claim 1, wherein
    said electrode layer is formed to be a predetermined pattern on a surface of said release layer, and a blank pattern layer having substantially the same thickness as that of said electrode layer is formed on a surface of the release layer not formed with the electrode layer.

8. The production method of an electronic device having an internal electrode as set forth in claim 7, wherein said blank pattern layer includes substantially the same dielectrics as those composing said green sheet.

9. The production method of an electronic device having an internal electrode as set forth in claim 7, wherein said blank pattern layer includes substantially the same binder as that of said green sheet.

10. The production method of an electronic device having an internal electrode as set forth in claim 1, wherein said adhesive layer includes substantially the same binder resin as that included in said green sheet.

11. The production method of an electronic device having an internal electrode as set forth in claim 1, wherein said electrode layer includes substantially the same binder resin as that included in said green sheet.

12. The production method of an electronic device having an internal electrode as set forth in claim 9, wherein said binder resin includes a butyral based resin.

13. The production method of an electronic device having an internal electrode as set forth in claim 1, wherein a thickness of said green sheet is 3 µm or thinner.

14. The production method of an electronic device having an internal electrode as set forth in claim 1, wherein a thickness of said release layer is not thicker than a thickness of said electrode layer.

15. The production method of an electronic device having an internal electrode as set forth in claim 1, wherein a pressure at the time of bonding said electrode layer with a surface of said green sheet is 0.2 to 15 MPa.

16. The production method of an electronic device having an internal electrode as set forth in claim 1, wherein a pressing temperature at the time of bonding said electrode layer with a surface of said green sheet is 40 to 100° C.

* * * * *